United States Patent Office 3,711,540
Patented Jan. 16, 1973

3,711,540
PRODUCTION OF ACRYLIC ACID BY
OXIDATION OF ACROLEIN
Helmut Nonnenmacher, deceased, late of Limburgerhof,
Pfalz, Germany, by Ruth S. H. Nonnenmacher, heiress-
in-law, and representative of minor heirs, Limburger-
hof, Pfalz, Richard Krabetz, Kirchheim, Weinstrasse,
Heinz Engelbach, Limburgerhof, Pfalz, and Helmut
Zinke-Allmang, Bad Duerkheim, Germany, assignors
to Badische Anilin- & Soda-Fabrik Aktiengesellschaft,
Ludwigshafen am Rhine, Germany
No Drawing. Filed Apr. 5, 1968, Ser. No. 719,830
Int. Cl. C07c 51/32, 57/04
U.S. Cl. 260—530                                    5 Claims

ABSTRACT OF THE DISCLOSURE

An improved process for the production of acrylic acid by contacting acrolein with gases containing molecular oxygen in the gas phase at temperatures of 220° to 450° C. in the presence of catalyst which in addition to oxygen, molybdenum and tungsten contain iron and/or nickel and/or manganese and/or copper, wherein the improvement comprises using catalysts which contain molybdenum, tungsten and iron and/or nickel and/or manganese and/or copper in the atomic ratio from 1:0.01:1 to 20:10:1. Acrylic acid produced according to the process may be used as such or after having been esterified with alkanols for the production of polymers.

---

This invention relates to an improved process for the production of acrylic acid by oxidation of acrolein with gas containing oxygen.

It is known that acrylic acid may be obtained by oxidation of acrolein with gas containing oxygen in the presence of catalyst containing molybdenum, tellurium, phosphorus and oxygen. The process has the disadvantage, however, that at the temperature used, tellurium migrates from the catalyst in a short time. The catalyst thus rapidly becomes inactive so that the yield of acrylic acid declines. According to another method acrolein can be oxidized into acrylic acid in the presence of catalysts containing phosphorus, tungsten, molybdenum and vanadium. It is only at temperatures above 400° C., however, that the process proceeds with good yields. Oxidation of acrolein to acrylic acid in the presence of catalysts is described in other patent specifications. Molybdenum trioxide and basic metals such as cobalt or nickel with additions of boron trioxide or phosphorus pentoxide are used as catalysts according to a process described in U.S. patent specification No. 3,087,964. Metals of Group VI–B of the Periodic System with additions such as bismuth, tin, cobalt, vanadium antimony, nickel, titanium or tungsten, are described as suitable catalysts in British patent specification No. 999,836. Furthermore it is known from Britsh patent specification No. 1,007,353 that catalysts containing iron, molybdenum, vanadium and antimony are suitable. Moreover it is known from British patent specification No. 903,034 that the oxidation of acrolein to acrylic acid will take place in the presence of catalysts which contain molybdenum and one or more than one polyvalent metal such as iron, tungsten, tin or antimony. All catalysts hitherto used however have the disadvantage that high space-time yields are not achieved.

It is an object of the invention to provide a process for the production of acrylic acid in which high space-time yields are obtained. Another object of the invention is to provide a process in which relatively low temperatures are used. It is a further object of the invention to provide a process in which the catalysts used remain effective over a long period.

In accordance with this invention these and other objects and advantages are achieved in an improved process for the production of acrylic acid by contacting acrolein with gas containing molecular oxygen in the gas phase at temperatures of from 220° to 450° C. in the presence of a catalyst containing not only oxygen, molybdenum and tungsten, but also iron and/or nickel and/or manganese and/or copper, the improvement comprising the use of a catalyst which contains molybdenum, tungsten and iron and/or nickel and/or manganese and/or copper in the atomic ratio from 1:0.01:1 to 20:10:1.

Pure acrolein may be used for the reaction but it is preferred to use a gas containing acrolein such as is obtained in the production of acrolein by oxidation of propylene. The gas advantageously has a content of acrolein of from 1 to 20% by volume. Particularly good results are achieved when the gas contains from 2 to 10% by volume of acrolein. In addition to acrolein, the gas may contain for example acrylic acid, acetic acid, formamide, acetaldehyde and small amounts of hydrocarbons, such as propylene, propane, butylene or butane, for example up to 3% by volume. Other gases, such as nitrogen, carbon dioxide, steam (for example up to 70% by volume) and oxygen (for example up to 20% by volume) may also be present.

Oxygen-containing gases in general have an oxygen content of 10 to 30% by volume, advantageously 15 to 25% by volume. It is particularly advantageous to use air. The gases may contain inert constituents, such as nitrogen, carbon dioxide or argon, in addition to oxygen.

It is advantageous to use 0.5 to 10, particularly 0.5 to 3, parts by volume of oxygen to 1 part of gaseous acrolein. When using gases containing acrolein (prepared for example by oxidation of propylene) as starting material any oxygen present should be taken into account.

The reaction is advantageously carried out at temperatures of from 220° to 450° C. Particularly good results are obtained by using temperatures of from 240° to 340° C. Oxidation is carried out in the gas phase and the residence time of the starting materials in contact with the catalyst should be from 0.1 to 20 seconds, preferably from 1 to 10 seconds.

The atomic ratio of molybdenum: tungsten: iron/nickel/manganese/copper in the catalysts used is from 1:0.01:1 to 20:10:1. Preferred catalysts contain the metals molybdenum, tungsten and iron and/or nickel and/or manganese and/or copper (particularly iron) in the atomic ratio from 2:0.1:1 to 10:2:1. The said metals may be present in the catalyst as mixtures of oxides or as compounds of these oxides with one another. The catalyst may be prepared for example by allowing an aqueous solution of one or more than one salt of iron and/or nickel and/or manganese and/or copper, for example a chloride or sulfate, to flow into an aqueous solution of ammonium paramolybdate and ammonium paratungstate. The precipitation is advantageously carried out in the presence of nitrogen bases such as ammonia, trimethylamine and pyridine, or their salts, at elevated temperature, for example at 50° to 100° C. It has proved to be particularly advantageous to maintain a pH value of 4 to 0.5, particularly 3 to 1.0, during the precipitation. A precipitate separates which, after it has been washed with water, is dried for example for ten to fifteen hours at 110° to 130° C. and then advantageously heated for three to twenty hours at 200° to 700° C., preferably at 350° to 450° C., in a current of air.

The catalysts may be prepared by another method by mixing oxides of the metals or readily decomposable salts of the metals, such as acetate, formates, oxalates, or nitrates, if necessary converting the salts into the oxides by heating, and then heating the resultant mixture at temperatures of for example 300° to 800° C., if desired in a current of air. The catalysts may be applied to carriers, such as silicic acid, aluminum oxide or silicates. These supported catalysts advantageously contain 90 to 10%, preferably 70 to 50%, by weight of catalyst with reference to the total of catalyst and carrier.

The process according to this invention may be carried out for example by arranging a catalyst of the said composition stationarily in a reaction tube and passing a mixture of acrolein and gas containing oxygen in the said ratio over the catalyst at the said temperature and with the said residence times. The hot reaction gas obtained may be cooled rapidly and washed, for example with water, the acrylic acid thus dissolving in the water. Unoxidized acrolein may be deposited, separated from the acrylic acid and returned to the reaction. It is advantageous to recycle the wash water so that acrylic acid accumulates therein. Acrylic acid is then advantageously extracted with an organic solvent such as ethyl acetate from the enriched aqueous solution. After the aqueous phase has been separated, for example by decantation, the acrylic acid is isolated from the extract by distillation.

Acrylic acid obtained by the process according to this invention is suitable for the production of high polymers.

The invention is further illustrated by the following examples in which the parts specified are parts by weight unless stated otherwise; they bear the same relation to parts by volume as the kilogram to the liter.

EXAMPLE 1

133.5 parts of ammonium heptamolybdate and ammonium tungstate (prepared by evaporating a solution of 15.24 parts of tungstic acid in 30 parts of concentrated aqueous ammonia solution) are dissolved in 300 parts of water. The solution is then adjusted to a pH value of 2.0 with aqueous hydrochloric acid. The solution is boiled and 79.8 parts of iron(III) chloride dissolved in 300 parts of water and a 1% by weight aqueous ammonia solution are allowed to flow simultaneously into the boiling solution so that a pH value of 2.0 is maintained. The precipitate obtained is filtered off and washed twice by being suspended in water and then dried for twelve hours at 110° C. The whole is then calcined in a current of air at 400° C. The catalyst contains molybdenum, tungsten and iron in the atomic ratio of 2.5:0.4:1.

1 part by volume of the above catalyst, which has a particle size of 2 to 4 mm., is arranged stationarily in a reaction tube. 280 parts by volume of a gas mixture which contains 4.3% by volume of acrolein, 2.2% by volume of acrylic acid and 3% by volume of oxygen is passed per hour through the reaction tube at 260° C. The reaction gas obtained is analyzed by gas chromatography. The acrolein used is converted to the extent of 58 mole percent into acrylic acid; 5 mole percent of the acrolein used is recovered as such.

In Examples 2 to 8 shown in the following table, the catalyst is prepared as in Example 1 using such amounts of starting materials that the specified atomic ratios of molybdenum, tungsten and iron are obtained. A gas mixture is used which contains 2.2% by volume of acrolein, 3.3% by volume of oxygen, 0.76% by volume of acrylic acid and 40% by volume of water vapour.

The following abbreviations are used in the table: E=example number; Mo:W:Fe=atomic ratio of molybdenum:tungsten:iron; temp.=reaction temperature in ° C.; conversion=conversion into acrylic acid in mole percent.

TABLE

| E | Mo:W:Fe | Temp. | Conversion |
|---|---------|-------|------------|
| 2 | 6:0.5:1 | 250 | 45 |
| 3 | 3:0.5:1 | 260 | 66.5 |
| 4 | 6:1:1 | 240–250 | 68 |
| 5 | 4:1:1 | 250 | 63.8 |
| 6 | 3:1:1 | 260 | 59 |
| 7 | 1:1:0 | 260 | 3 |
| 8 | 1:0:1 | 260 | 0 |

We claim:

1. A process for the production of acrylic acid which comprises contacting acrolein with a gas containing molecular oxygen in the gas phase in a volumetric ratio of acrolein to oxygen of 1:0.5 to 1:10 at a temperature of from 240° to 340° C. in the presence of a catalyst mixture consisting essentially of the oxides of the metals (1) molybdenum, (2) tungsten, and (3) iron or compounds of these oxides with one another, said metals being present in the atomic ratio of 2:0.1:1 to 10:2:1.

2. A process as claimed in claim 1, wherein acrolein and oxygen are used in a volumetric ratio of from 1:0.5 to 1:3, the catalyst mixture of 1, 2 and 3 is in the atomic ratio of 2.5:0.4:1 to 6:1:1, and the process is carried out at a temperature of from 240° C. to 260° C.

3. A process as claimed in claim 1 wherein a gas containing 10 to 30% by volume of molecular oxygen is used.

4. A process as claimed in claim 1 wherein air is used as the gas containing molecular oxygen.

5. A process as claimed in claim 1 in which the period during which the starting materials are in contact with the catalyst is from 0.1 to 20 seconds.

References Cited

UNITED STATES PATENTS

| 3,087,964 | 4/1963 | Koch et al. | 260—530 |
| 3,238,253 | 3/1966 | Kerr | 260—530 |
| 3,405,172 | 10/1968 | Brown et al. | 260—530 |
| 3,567,773 | 3/1971 | Yamaguchi et al. | 260—530 N |

FOREIGN PATENTS

| 903,034 | 8/1962 | Great Britain | 260—533 N |

LORRAINE A. WEINBERGER, Primary Examiner

R. D. KELLY, Assistant Examiner

U.S. Cl. X.R.

252—458, 465, 470